_United States Patent_ [19]

Bozhko et al.

[11] Patent Number: 4,796,868

[45] Date of Patent: Jan. 10, 1989

[54] APPARATUS FOR THERMAL DEBURRING OF PARTS

[75] Inventors: Valery P. Bozhko; Alexei V. Losev; Vitaly Strizhenko; Viktor I. Pleshkov, all of Kharkov; Ivan A. Levityansky, Leningradskaya, all of U.S.S.R.

[73] Assignee: Kharkovsky Aviatsionny Institut, Kharkov, U.S.S.R.

[21] Appl. No.: 165,263

[22] PCT Filed: Apr. 30, 1986

[86] PCT No.: PCT/SU86/00038

§ 371 Date: Dec. 28, 1987

§ 102(e) Date: Dec. 28, 1987

[87] PCT Pub. No.: WO87/06511

PCT Pub. Date: Nov. 5, 1987

[51] Int. Cl.[4] .............................. C21D 9/00; B23K 7/00
[52] U.S. Cl. ..................................... 266/51; 266/261; 432/159; 432/197; 432/205
[58] Field of Search ..................... 266/48, 51, 261; 432/159, 197, 205

[56] References Cited

U.S. PATENT DOCUMENTS 3,475,229 10/1969 Green et al. .......................... 148/9
3,608,879 9/1971 Birr et al. ............................ 266/51
3,666,252 5/1972 Rice .................................. 432/57

Primary Examiner—Wayland Stallard
Attorney, Agent, or Firm—Lilling & Greenspan

[57] ABSTRACT

An apparatus has a cylindrical working chamber (2) with a bottom member (7) provided with admission and discharge valves (3,5) and a spark plug (4). The bottom member (7) is made as a hollow cylinder having end plates and openings (8), the height and outside diameter of which are approximately equal to the height and inside diameter of the working chamber (2). Sealing rings (11, 12) are interposed between the chamber (2) and the hollow cylinder.

2 Claims, 2 Drawing Sheets

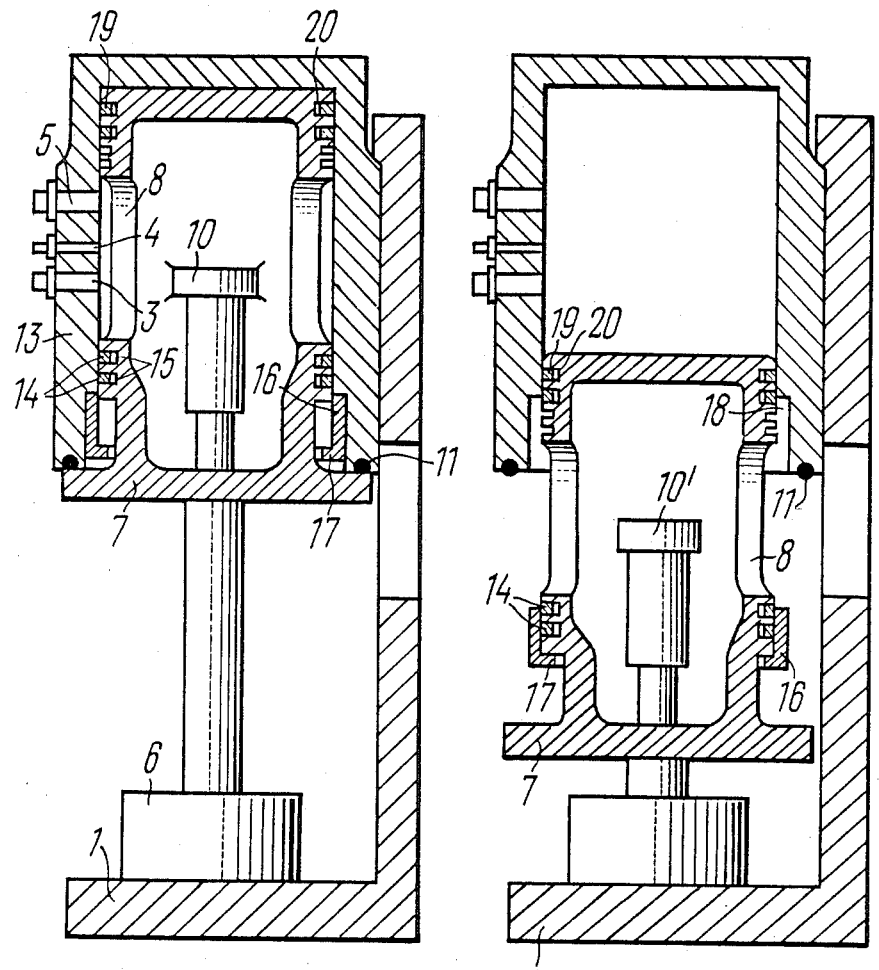

APPARATUS FOR THERMAL DEBURRING OF PARTS

TECHNICAL FIELD

The invention relates to the mechanical engineering, and in particular, it deals with the treatment of materials and products in heated chemically active gases so as to burn-out surface defects. More specifically, the invention deals with apparatuses for thermal deburring of parts at mechanical engineering works.

BACKGROUND OF THE INVENTION

Known in the art is an apparatus for thermal deburring of parts, comprising an C-shaped frame having a working chamber and a worktable having bottom members for supporting parts, the bottom members alternately sealing a loading hole of the working chamber (cf. U.S. Pat. No. 3,666,252, Cl. 266-2, publ. 1972). This apparatus has powerful hydraulic cylinders with a linkage for retaining the bottom member in the loading hole of the chamber during combustion of a fuel mixture.

The retaining linkages feature a high rigidity, hence high consumption of metal for their manufacture since the linkage members have to take up considerably impulse loads without elastic deformations so as to ensure reliable sealing of the chamber. For the same reason, the prior art apparatus is provided with a rugged and rigid bed.

At the same time, use of the retaining linkages lowers productivity since time is needed for their actuation during retaining and release of the bottom member.

The parts having been treated, the hydraulic actuator acts upon the linkage which lowers the bottom member. The combustion products at high pressure and temperature are discharged through the opening thus defined so as to act directly upon the PTFE seal which would rapidly fall.

Also known in the art is an apparatus for thermal deburring of parts, comprising a cylindrical working chamber having an inlet valve, an outlet valve and a spark plug, a bottom member for closing and opening a loading hole of the chamber having a worktable for supporting parts being treated and mounted for axial movement with respect to the chamber, and an elastic sealing ring for sealing the joint between the bottom member and the chamber (cf. USSR Inventor's Certificate No. 988499, Int.Cl. B 2 K 28/00, publ. 1983).

This apparatus cannot, however, ensure a high enough productivity and reliability in operation since reliable retainment of the bottom member in the chamber is necessary so as to prevent the bottom member from being forced out during filling and ignition of a fuel mixture. In order to accomplish this, the prior art apparatus makes use of a rotatable sleeve defining a bayonet lock with the bottom member, the members of the lock taking-up maximum process forces, i.e. they are acted upon by a force determined by maximum pressure of combustion products of the fuel mixture. The provision of the rotatable sleeve and a drive for its rotation results in a greater metal consumption for manufacture, and repeated loading of the members of the bayonet lock results in their deformations and rapid wear thus lowering reliability of the apparatus. The need to rotate the sleeve after the bottom member has been raised so as to form the bayonet joint and to rotate the sleeve back in the opposite direction for releasing the bottom member after the parts have been treated result in a longer working cycle and limit productivity. In addition, the apparatus is not reliable enough in operation since the direct action of high temperature and pressure of combustion products upon the elastic sealing ring disposed between the working chamber and bottom member is not eliminated.

Sealing the working chamber by means of an elastic sealing ring is not efficient; the ring, which is in direct contact with the fuel mixture is rapidly worn under the action of high temperature and pressure generated by combustion of gas-oxygen mixtures; the ring may also be burnt-through, broken, and the like. All these factors lower reliability and safety of the apparatus in operation while long time intervals needed for retaining and releasing the bottom member lower productivity.

DISCLOSURE OF THE INVENTION

The primary object of the present invention is to improve the construction of the apparatus for thermal deburring of parts so as to provide a reliable sealing of the union, the bottom member and the working chamber during the burning process of a fuel mixture without the use of any joining and retaining mechanisms and to exclude any direct effect of the combustion products on the sealing.

This object is accomplished by that in an apparatus for thermal deburring of parts, comprising a cylindrical working chamber having an inlet valve, an outlet valve and a spark plug, a bottom member for closing and opening of a loading hole having a worktable for supporting parts being treated and mounted for movement along the axis of the chamber, and an elastic sealing ring for sealing the joint between the bottom member and the chamber, according to the invention, the bottom member comprises a hollow cylinder having end plates and openings in the peripheral wall, the height and outside diameter of the cylinder being about equal to the height and inside diameter of the working chamber, the apparatus being provided with an auxiliary sealing ring disposed between the chamber and hollow cylinder on the side opposite to the loading hole of the chamber.

The apparatus is preferably provided with at least one split metal ring disposed between the chamber and hollow cylinder on the side of the loading hole of the chamber behind the elastic sealing ring as viewed in the direction from the extremity of the chamber towards the middle part thereof in the axial direction, and with a protective ring for said split ring which is slidable along the surface of the hollow cylinder during movement of the latter, at least one metal split ring being used as the auxiliary sealing ring.

The apparatus for thermal deburring of parts according to the invention is constructed with a closed kinematic chain so that no additional means for retaining the bottom member are required, whereby reliability is improved and metal consumption of manufacture is lowered by 15–20%. Reliability and safety of the apparatus in operation are also improved due to the provision of metal sealing rings on the bottom member so as to avoid direct action of hot gases upon the elastic sealing ring.

As there are no retaining and release operation in the apparatus according to the invention, the productivity is 10–15% higher.

BRIEF DESCRIPTION OF THE DRAWINGS

The invention will now be described with reference to specific embodiments illustrated in the accompanying drawings, in which:

FIG. 4 is a longitudinal sectional view of an embodiment of the apparatus shown in FIGS. 1, 2, with split metal rings, shown in the working position;

FIG. 5 is ditto of FIG. 4, in the initial position.

BEST MODE FOR CARRYING OUT THE INVENTION

Figure 3:
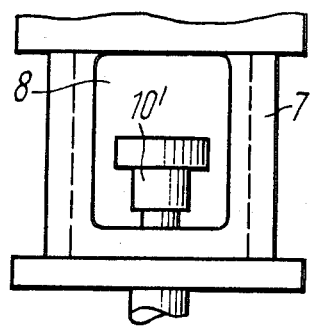
FIG. 3 is a view taken along arrow A in FIG. 2.
Figure 1:
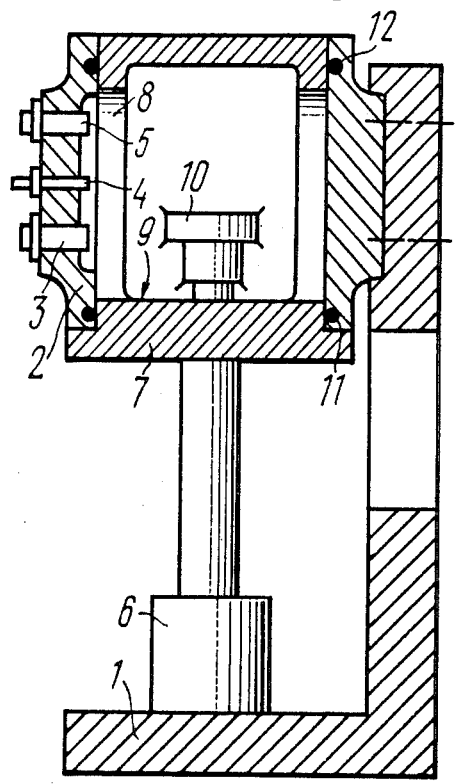
FIG. 1 is a longitudinal section of an apparatus for thermal deburring of parts shown in the working position.
Figure 2:
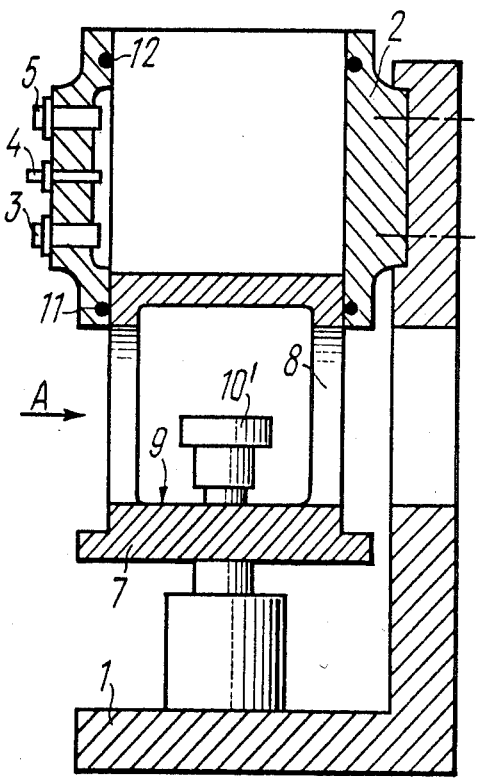
FIG. 2 is ditto of FIG. 1, in the initial position.

An apparatus for thermal deburring of parts shown in FIGS. 1, 2, 3 comprises a stationary frame 1 in which is rigidly secured a working chamber 2 having an admission valve 3, a spark plug 4 and a discharge valve 5 incorporated in its wall. The chamber 2 is in the form of a cylinder open at both ends, the lower hole of the chamber 2 (as shown in the drawings) is a loading hole. The frame 1 also supports a pneumatic cylinder 6 having a movable member thereof carrying a bottom member 7 which is designed for closing and opening the chamber 2 and which comprises a hollow cylinder having end plates and openings 8 in the peripheral wall, the height and outside diameter of the cylinder being about equal to the height and inside diameter of the working chamber 2. The inner surface of the lower end plate of the bottom member 7 (as shown in the drawings) functions as a worktable 9 for supporting parts 10,10' being treated which are installed and removed through the openings 8. The bottom member 7 is mounted for movement along the axis of the chamber 2. An elastic sealing ring 11 is installed between the chamber 2 and bottom member 7 on the side of the loading hole of the chamber 2 and an auxiliary sealing ring 12 is provided on the side opposite to the loading hole. The sealing rings 11 and 12 may be made of any appropriate sealing materials, e.g. of rubber of PTFE.

In the embodiment of the apparatus for thermal deburring of parts shown in FIGS. 4, 5, the difference from the embodiment shown in FIGS. 1, 2, 3 resides in that a chamber 13 is closed on top (FIGS. 4, 5), and at least one, and in this case, two split metal rings 14 are installed between the chamber and the bottom member 7 on the side of the loading hole of the chamber, behind the elastic sealing ring 11 as viewed in the direction from the extremety of the chamber 13 towards the middle part thereof along the axis of the chamber, and the hollow cylinder (bottom member 7) has annular grooves 15 to receive the metal rings. According to the invention, the apparatus has a protective ring 16 with a shoulder 17 which is mounted in a bore 18 of the chamber 13 for sliding along the surface of the hollow cylinder so as to retain the split rings 14 during movement of the bottom member 7. In addition, in this embodiment of the apparatus, two metal split rings 19 are provided in annular grooves 20 made adjacent to the upper end of the hollow cylinder (FIGS. 4, 5) to replace the auxiliary elastic sealing ring.

The apparatus for thermal deburring of parts functions in the following manner.

In the initial position the bottom member 7 (FIGS. 1, 2, 3) is lowered as shown in FIG. 2. A part 10 to be treated (or a plurality of parts to be treated) are placed through the opening 8 onto the worktable 9. Then the bottom member 7 supporting the part 10 is raised by the pneumatic cylinder 6 along the inner wall of the working chamber 2 to the upper position as shown in FIG. 1. The elastic sealing rings 11 and 12 will thus seal the interior space of the working chamber 2, defined by the peripheral walls of the working chamber 2 and hollow cylinder and end plates of the hollow cylinder (bottom member 7).

After the chamber 2 has been sealed, a fuel mixture is admitted to its interior space through the openings 8 and admission valve 3, and the fuel mixture is ignited by the spark plug 4.

As a result of a rapid temperature and pressure rise in the interior space of the working chamber 2, burs of the parts 10 being treated are burnt and/or fused owing to their large surface and relatively small mass.

After the discharge valve 5 is opened, combustion products are discharged from the interior space of the working chamber 2, and the bottom member 7 is lowered by the pneumatic cylinder 2 to take the initial position. After the part 10' being treated has been removed from the interior space of the working chamber 2 and a next part 10 has been placed in the worktable 9, the working cycle is repeated.

During operation of the apparatus shown in FIGS. 4, 5 air pressure in the pneumatic cylinder 6 is chosen in such a manner as to ensure sealing of the chamber 13 during filling thereof with a fuel mixture at initial parameters. During burning of the fuel mixture, which lasts for hundredths of a second, sealing of the interior space of the chamber 13 and bottom member 7 is ensured by the split metal rings 14, 19, i.e. high temperature and pressure gases cannot act directly upon the elastic sealing ring 11.

The apparatus according to the invention is made in accordance with a closed force transmitting concept so that no additional means for retaining the bottom member 7 in the chamber 13 (2) are required both during filling of the chamber with a fuel mixture an during ignition the fuel mixture when maximum pressure is built-up in the chamber 13(2). Pressure of the fuel mixture both with the initial parameters during filling of the chamber and with maximum parameters during combustion of the fuel mixture is taken-up by the end walls of the hollow cylinder and by the peripheral surface thereof as well as by the peripheral surface of the working chamber 13(2) (through the openings 8), i.e. the forces built-up inside the hollow cylinder and working chamber 13(2) act only upon their walls without being transmitted to the pneumatic cylinder 6 and frame 1.

The provision of the auxiliary seal 12 (FIGS. 1, 2) inside the working chamber 2 prevents fuel mixture from escaping through the openings 8 in the peripheral wall of the hollow cylinder.

Owing to the provision of the metal sealing rings 14, 19 (FIGS. 4, 5) on the hollow cylinder, high-temperature combustion products cannot act directly upon the elastic sealing ring 11 which seals the chamber 13 during filling thereof with a gaseous fuel mixture. The provision of an axially movable protective ring 16 with the shoulder 17 in the lower part of the chamber 13 prevents the split metal rings 14 from opening during lowering and raising of the bottom members 7, whereby reliability of the apparatus in operations is achieved.

INDUSTRIAL APPLICABILITY

The present invention may be used at mechanical-engineering works for treatment of metal and plastic parts.

I claim:

1. An apparatus for thermal deburring of parts, comprising a cylindrical working chamber (2) with admission and discharge valves (3,5) and a spark plug (4), a bottom member (7) for closing and opening the chamber (2) provided with a worktable (9) for supporting parts (10) being treated, movably mounted along the axis of the chamber (2), and an elastic sealing ring (11) for sealing the joint between the bottom member (7) with the chamber (2), characterized in that the bottom member (7) comprising a hollow cylinder with end plates and openings (8) in the peripheral wall, the height and the outside diameter of the cylinder being approximately equal to the height and outside diameter of the working chamber (2), while the apparatus is provided with an additional sealing ring (12) interposed between the chamber (2) and the hollow cylinder on the side opposite to a loading hole in the chamber (2).

2. An apparatus according to claim 1, characterized in that it is provided with at least one split metal sealing ring (14) interposed between a chamber (13) and the hollow cylinder on the side of a loading hole of the chamber (13) behind the elastic sealing ring (11) in the direction from the edge of the chamber (13) toward the center thereof and a protective ring (16) for said split ring (14) slidably mounted along the surface of the hollow cylinder upon displacement of the latter, whereas used as an additional sealing ring is at least one split metal ring (19).

* * * * *